3,723,383
NOVEL FLAME RETARDANT COMPOSITIONS OF MATTER

Henryk A. Cyba, Evanston, Ill., assignor to Universal Oil Products Company, Des Plaines, Ill.
No Drawing. Filed July 26, 1971, Ser. No. 166,242
Int. Cl. C08f *45/04, 45/58*
U.S. Cl. 260—41 B                                                 3 Claims

ABSTRACT OF THE DISCLOSURE

Novel flame retardant compositions of matter comprise a thermoplastic compound, a polychloro-substituted organic compound, a polybromo-substituted organic compound and, if so desired, an antimony-containing compound or a tin-containing compound. The polyhalo-substituted organic compounds are characterized by possessing a low volatility, a high molecular weight, and a high halogen content. These compositions of matter are exemplified by a mixture of polypropylene, 5,6,7,8,9,9-hexachloro-1,2,3,4,4a,5,8,8a-octahydro-5,8-methano-2,3-naphthalene dicarboxylic anhydride, hexabromocyclododecane and antimony trioxide.

STATE OF THE ART

Heretofore, it is known in the prior art that polymeric compounds such as thermoplastic compounds may be admixed with halogen-containing compounds such as polychloro-substituted organic compounds or polybromo-substituted organic compounds to impart flame retardant properties to the finished compositions of matter. In addition it is also known in the prior art that the addition of certain metallic compounds such as antimony-containing compounds or tin-containing compounds to the mixture of the polymer and the halogen-containing compound will enhance the aforementioned flame retardant propertes. However, as will be hereinafter shown in greater detail, by combining polychloro-substituted organic compounds with polybromo-substituted organic compounds, each of said compounds possessing certain characteristics, it is possible to obtain a relatively greater degree of flame retardant properties in the thermoplastic compound than would be present in a mixture of a thermoplastic compound with either a chloro-substituted organic compound or a bromo-substituted organic compound as the only additive to the substrate.

SPECIFICATION

This invention relates to novel compositions of matter comprising a mixture of thermoplastic compound, a polychloro-substituted organic compound and a polybromo-substituted organic comypound. In addition, the aforementioned composition of matter may also contain, in admixture therewith, an antimony-containing compound or a tin-containing compound. More specifically, the invention relates to these compositions of matter which are useful in situations where a high degree of flame retardancy or fire resistance is a required physical characteristic of the finished product.

The novel compositions of matter will, as hereinbefore set forth, be useful in situations where the product may be subjected to excessive heat or to the action of a possible flame, such places including architectural panels for construction work, wall plugs for electrical connections, soundproofing or insulation in walls, ceilings, etc., cushions for various vehicle seats such as airplane seats, automobile seats, bus seats, truck seats, etc. In addition, the novel composition of matter may be used in automotive accessories, appliance housings, printed circuits, wire coatings. Furthermore, the composition of matter when utilized as a constituent of paint, lacquer, varnishes or protective coatings, films, etc., will also impart a flame resistancy to these compounds and therefore render them commercially attractive as articles of commerce. In addition to imparting the desirable physical characteristics of flame retardancy to the various articles of manufacture, the compounds will also be rendered more stable to color changes and therefore will be important components of these compounds whenever it is desirable that discoloration of the finished product is to be avoided or will tend to render such articles unusable. Other desirable physical characteristics of the compositions of matter will be found in the fact that the one component of the compound, besides adding flame retardancy to the various compounds containing at least one reactive functional group, will also substantially preserve such physical properties as elongation, tensile strength, melt index, degree of cross-linking, bending strength, impact strength, etc.

It is therefore an object of this invention to provide novel compositions of matter which possess desirable physical characteristics.

Another object of this invention is to provide novel compositions of matter which possess desirable physical properties of flame retardancy and flameproofing thereby rendering said compositions of matter important articles of manufacture.

In one aspect an embodiment of this invention resides in a flame retardant composition of matter comprising a thermoplastic compound, a polychloro-substituted organic compound which possesses a low volatility, a high molecular weight and a high chlorine content, and a polybromo-substituted organic compound which possesses a low volatility, a high molecular weight and a high bromine content.

A specific embodiment of this invention is found in a novel flame retardant composition of matter which comprises polypropylene, bis(1,4,5,6,7,7-hexachloronorborn-5-en-2yl)-benzene, hexabromobiphenyl and antimony trioxide.

Other objects and embodiments will be found in the following further detailed description of the present invention.

As hereinbefore set forth the present invention is concerned with novel flame retardant compositions of matter which have been found to possess excellent physical characteristics including relatively high resistance to flame and flame retardancy. These novel flame retardant compositions of matter comprise an admixture of a thermoplastic compound, a polychloro-substituted organic compound, a polybromo-substituted organic compound, and an antimony-containing compound. Both the polychloro-substituted and polybromo-substituted organic compounds are characterized by possessing a low volatility as well as a high molecular weight and a high halogen content. For example, the polychloro-substituted organic compound will contain a chlorine content of at least 45% and will have a molecular weight of at least 350. The polybromo-substituted organic compound will have a bromine content of at least 50% as well as having a molecular weight of at least 250. As will be hereinafter shown in greater detail, the novel composition of matter of this invention will possess the desirable physical characteristics of not dripping when subjected to the action of a flame, will have an unexpectedly greater or higher oxygen index than that which is possessed by other compositions of matter not containing all of the components of the mixture and, in addition, those novel compositions of matter will meet the specification for Underwriters Laboratories Test Subject 94 or 746 as well as meeting the SEO or SEI classifications, the specific specifications and classifications of these tests being hereinafter set forth in greater detail.

The thermoplastic compounds which make one component of the novel composition of matter of the present invention will comprise thermoplastic compounds. Some specific examples of these thermoplastic compounds will include polymers, copolymers and terpolymers of polyolefins such as polyethylene, polypropylene, polystyrene, polyvinyl chloride, as well as copolymers and terpolymers thereof such as polyethylene-polypropylene, etc.; acrylonitrile-butadiene-styrene formulations (commonly known as ABS), polyphenyl ethers (polyphenylene oxide) which may or may not be modified with styrene, acrylate and methacrylate polymers and copolymers, polyurethanes, polyesters, rubbers both synthetic and naturally occurring, such as EPDM, SBR, butyl etc. These various thermoplastic substances are only representative of the class of compounds which may be used, and it is to be understood that the present invention is not necessarily limited thereto.

Another component of the novel composition of matter of the present invention will comprise polychloro-substituted organic compounds which, as hereinbefore set forth, possess a low volatility, a chlorine content of at least 45% and a molecular weight of at least 350. Of these polychloro-substituted organic compounds the preferred compounds comprised the Diels-Alder addition products of a polychloro-substituted cycloalkadiene and a cyclic diene or triene. The preferred polychloro-substituted cycloalkadiene comprises hexachlorocycloalkadiene. It is also contemplated within the scope of this invention that other polychloro-substituted cycloalkadienes such as 1,2,3,4,5-pentachlorocyclopentadiene, 1,2,3,4-tetracyclopentadiene, 1,2,3,4-tetra-1,3-cyclohexadiene, 1,2,3,4,5 - pentachloro - 1,3 - cyclohexadiene, 1,2,3,4,5,6-hexachloro-1,3-cyclohexadiene, octachloro-1,3-cyclohexadiene, etc., may also be used. Some specific examples of cyclic dienes or trienes which may be reacted with the aforementioned polychloro - substituted cycloalkadienes will include tetrahydrophthalic anhydride, tetrahydrophthalic acid, furan, vinyl cyclohexene, divinylbenzene, cyclopentadiene, 1,5-cyclooctadiene, etc., as well as the aforesaid compounds containing various substituents on the ring. Some specific examples of these polychloro-substituted organic compounds which may be used will include 1,4,5,6,7,7-hexachlorobicyclo-[2.2.1]-5-heptene-2,3-dicarboxlic acid and the anhydride thereof,
5,6,7,8,9,9-hexachloro-1,2,3,4,4a,5,8,8a-octahydro-5,8-methano-2,3-naphthalenedicarboxylic acid and the anhydride thereof,
5,6,7,8,9,9-hexachloro-1,2,3,4,4a,5,8,8a-octahydro-1,4,5,8-dimethano-2,3-naphthalenedicarboxylic acid and the anhydride thereof,
1,3- and 1,4-bis(1,4,5,7,7-hexachloronorborn-5-en-2-yl)benzene,
1,4,7,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene,
1,2,3,4,6,7,8,9,13,14,14-dodecachloro-1,4,5,5a,6,9,10,10a,11,11,12,12-dodecahydro-1,4:5,10:6,9-trimethano-11-H-benzo[b]fluorene,
1,2,3,4,5,6,7,8,10,10,11,11-dodecachloro-1,4,4a,4b,5,8,8a,9a-octahydro-1,4:5,8-dimethanefluorene,
1,4,6,9-dimethano-1,2,3,4,6,7,8,9,10,10a,11,11a-dodecachloro-1,4,4a,5,5a,9,9a,9b-octahydrodibenzofuran.

In addition to the aforementioned acids and anhydrides and other compounds, it is also contemplated that derivatives of the aforementioned acids which are referred to generically as esters of polyhalosubstituted polyhydrocyclicdicarboxylic acids, N-substituted polyhalo-substituted polyhydrocyclicdicarboximides, N-substituted polyhalo aromatic orthodicarboximides haloaryl imides of polyhalopolyhydrocyclicdicarboxylic acids, N - s-triazyl imides of polyhalo-substituted polyhydrocyclicdicarboxylic acids, and imides (both monoimides and bisimides) of polyhalo-substituted polyhydrocyclicdicarboxylic acids may also be used, the aforesaid dicarboxylic acids all being ortho in configuration. Some specific examples of these compounds will include esters such as the monomethyl ester of 1,4,5,6,7,7-hexachlorobicyclo-[2.2.1]-5-heptene-2,3-dicarboxylic acid,
the dimethyl ester of 1,4,5,6,7,7-hexachlorobicyclo-[2.2.1]-5-heptene-2,3-dicarboxylic acid,
the monoethyl ester of 1,4,5,6,7,7-hexachlorobicyclo-[2.2.1]-5-heptene-2,3-dicarboxylic acid,
the monomethyl ester of 5,6,7,8,9,9-hexachloro-1,2,3,4,4a,5,8,8a-octahydro-5,8-methano-2,3-naphthalenedicarboxylic acid,
the dimethyl ester of 5,6,7,8,9,9-hexachloro-1,2,3,4,4a,5,8,8a-octahydro-5,8-methano-2,3-naphthalenedicarboxylic acid,
the monoethyl ester of 5,6,7,8,9,9-hexachloro-1,2,3,4,4a,5,8,8a-octahydro-5,8-methano-2,3-naphthenedicarboxylic acid
the diethyl ester of 5,6,7,8,9,9-hexachloro-1,2,3,4,4a,5,8,8a-octahydro-5,8-methano-2,3-naphthalenedicarboxylic acid,
the monomethyl ester of 5,6,7,8,9,9-hexachloro-1,2,3,4,4a,5,8,8a-octahydro-1,4,5,8-dimethano-2,3-naphthalenedicarboxylic acid,
the dimethyl ester of 5,6,7,8,9,9-hexachloro-1,2,3,4,4a,5,8,8a-octahydro-1,4,5,8-dimethano-2,3-naphthalenedicarboxylic acid,
the monoethyl ester of 5,6,7,8,9,9-hexachloro-1,2,3,4,4a,5,8,8a-octahydro-1,4,5,8-dimethano-2,3-naphthalenedicarboxylic acid,
the diethyl ester of 5,6,7,8,9,9-hexachloro-1,2,3,4,4a,5,8,8a-octahydro-1,4,5,8-dimethano-2,3-naphthalenedicarboxylic acid, etc.;
N-substituted polyhalo-substituted polyhydrocyclicdicarboximides such as guanyl-1,4,5,6,7,7-hexachlorobicyclo-[2.2.1]-5-heptene-2,3-dicarboximide,
guanyl-5,6,7,8,9,9-hexachloro-1,2,3,4,4a,8,8a-octahydro-5,8-methano-2,3-naphthalenedicarboximide;
N-substituted polyhaloaromatic ortho dicarboximides such as 1,4,5,6-tetrachloro-2,3-phthaloimide,
N-methyl-1,4,5,6-tetrachloro-2,3-phthaloimide,
N-cyclopentyl-1,4,5,6-tetrachloro-2,3-phthaloimide,
N-cyclopentyl-1,4,5,6,7,8-hexachloro-2,3-dicarboxynaphthylimide, etc.;
haloarylimides of polyhalo-substituted polyhydrocyclicdicarboxylic acids such as α-amino-α'-(1,4,5,6,7,7-hexachlorobicyclo-[2.2.1]-5-heptene-2,3-dicarboximido)-2,3-dichloro-p-xylene,
α-amino-α'-(5,6,7,8,9,9-hexachloro-1,2,3,4,4a,5,8,8a-octahydro-5,8-methano-2,3-naphthalenedicarboximido-2,3-dichloro-p-xylene,
α-amino-α'-(1,4,5,6,7,7-hexachlorobicyclo-[2.2.1]-5-heptene-2,3-dicarboximido)-2,3,5,6-tetrachloro-p-xylene,
α-amino-α'-(5,6,7,8,9,9-hexachloro-1,2,3,4,4a,5,8,8a-octahydro-5,8-methano-2,3-naphthalenedicarboximido)-2,3,5,6-tetrachloro-p-xylene,
α,α'-bis(1,4,5,6,7,7-hexachlorobicyclo-[2.2.1]-5-heptene-2,3-dicarboximido)-2,3-tetrachloro-p-xylene,
α,α'-bis(5,6,7,8,9,9-hexachloro-1,2,3,4,4a,5,8,8a-octahydro-5,8-methano-2,3-naphthalenedicarboximido)-2,3-tetrachloro-p-xylene,
α,α'-bis(5,6,7,8,9,9-hexachloro-1,2,3,4,4a,5,8,8a-octahydro-1,4,5,8-dimethano-2,3-naphthalenedicarboximido)-2,3-tetrachloro-p-xylene,
4,4'-bis(1,4,5,6,7,7-hexachlorobicyclo-[2.2.1]-5-heptene-2,3-dicarboximidomethyl)-2,2',3,3',5,5',6,6'-octachlorodiphenyl ether,
4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, etc.;
N-s-triazyl imides of polyhalo-substituted polyhydrocyclicdicarboxylic acids such as 2-N-(1,4,5,6,7,7-hexachlorobicyclo-[2.2.1]-5-heptene-2,3-dicarboximido)-4,6-dichloro-s-triazine,
2-N-(5,6,7,8,9,9-hexachloro-1,2,3,4,4a,5,8,8a-octahydro-5,8-methano-2,3-naphthalenedicarboximido)-4,6-dichloro-s-triazine,
2-N-(5,6,7,8,9,9-hexachloro-1,2,3,4,4a,5,8,8a-octahydro-1,4,5,8-dimethano-2,3-naphthalenedicarboximido)-4,6-dichloro-s-triazine,
2-N-(1,4,5,6,7,7-hexachlorobicyclo-[2.2.1]-5-heptene-2,3-dicarboximido)-4,6-diphenyl-s-triazine,
2-N-(5,6,7,8,9,9-hexachloro-1,2,3,4,4a,5,8,8a-octahydro-5,8-methano-2,3-naphthalenedicarboximido)-4,6-diphenyl-s-triazine,
2-N-(5,6,7,8,9,9-hexachloro-1,2,3,4,4a,5,8,8a-octahydro-1,4,5,8-dimethano-2,3-naphthalenedicarboximido)-4,6-diphenyl-s-triazine,
2-N-(1,4,5,6,7,7-hexachlorobicyclo-[2.2.1]-5-heptene-2,3-dicarboximido)-4,6-dicyclopentyl-s-triazine,
2-N-(5,6,7,8,9,9-hexachloro-1,2,3,4,4a,5,8,8a-octahydro-5,8-methano-2,3-naphthalenedicarboximido)-4,6-dicyclopentyl-s-triazine,
2-N-(5,6,7,8,9,9-hexachloro-1,2,3,4,4a,5,8,8a-octahydro-1,4,5,8-dimethano-2,3-naphthalenedicarboximido)-4,6-dicyclopentyl-s-triazine,
2,4-bis-[N-(1,4,5,6,7,7-hexachlorobicyclo-[2.2.1]-5-heptene-2,3-dicarboximido)]-6-chloro-s-triazine,
2,4-bis-[N-(5,6,7,8,9,9-hexachloro-1,2,3,4,4a,5,8,8a-octahydro-5,8-methano-2,3-naphthalenedicarboximido)]-6-chloro-s-triazine,
2,4-bis-[N-(5,6,7,8,9,9-hexachloro-1,2,3,4,4a,5,8,8a-octahydro-1,4,5,8-dimethano-2,3-naphthalenedicarboximido)]-6-chloro-s-triazine,
2,4-bis-[N-(1,4,5,6,7,7-hexachlorobicyclo-[2.2.1]-5-heptene-2,3-dicarboximido)]-6-methyl-s-triazine,
2,4-bis-[N-(5,6,7,8,9,9-hexachloro-1,2,3,4,4a,5,8,8a-octahydro-5,8-methano-2,3-naphthalenedicarboximido)]-6-methyl-s-triazine,
2,4-bis[N-(5,6,7,8,9,9-hexachloro-1,2,3,4,4a,5,8,8a-octahydro-1,4,5,8-dimethano-2,3-naphthalenedicarboximido)]-6-methyl-s-triazine,
2,4,6-tris-[N-(1,4,5,6,7,7-hexachlorobicyclo-[2.2.1]-5-heptene-2,3-dicarboximido)]-s-triazine,
2,4,6-tris-[N-(5,6,7,8,9,9-hexachloro-1,2,3,4,4a,5,8,8a-octahydro-5,8-methano-2,3-naphthalenedicarboximido)]-s-triazine,
2,4,6-tris-[N-(5,6,7,8,9,9-hexachloro-1,2,3,4,4a,5,8,8a-octahydro-1,4,5,8-dimethano-2,3-naphthalenedicarboximido)]-s-triazine etc.;
imides of polyhalo-substituted polyhydrocyclicdicarboxylic acids such as the imide of 1,4,5,6,7,7-hexachlorocyclo[2.2.1]-5-heptene-2,3-dicarboxylic acid,
the imide of 5,6,7,8,9,9-hexachloro-1,2,3,4a,5,8,8a-octahydro-5,8-methano-2,3-naphthalenedicarboxylic acid,
the imide of 5,6,7,8,9,9-hexachloro-1,2,3,4,4a,5,8,8a-octahydro-1,4,5,8-dimethano-2,3-naphthalenedicarboxylic acid,
the N-methyl imide of 1,4,5,6,7,7-hexachlorobicyclo-[2.2.1]-5-heptene-2,3-dicarboxylic acid,
the N-methyl imide of 5,6,7,8,9,9-hexachloro-1,2,3,4,4a,5,8,8a-octahydro-5,8-methano-2,3-naphthalenedicarboxylic acid,
the N-methyl imide of 5,6,7,8,9,9-hexachloro-1,2,3,4,4a,5,8,8a-octahydro-1,4,5,8-dimethano-2,3-naphthalenedicarboxylic acid,
the N-ethyl imide of 1,4,5,6,7,7-hexachlorobicyclo-[2.2.1]-5-heptene-2,3-dicarboxylic acid,
the N-ethyl imide of 5,6,7,8,9,9-hexachloro-1,2,3,4,4a,5,8,8a-octahydro-5,8-methano-2,3-naphthalenedicarboxylic acid,
the N-ethyl imide of 5,6,7,8,9,9-hexachloro-1,2,3,4,4a,5,8,8a-octahydro-1,4,5,8-dimethano-2,3-naphthalenedicarboxylic acid,
the N-butyl imide of 1,4,5,6,7,7-hexachlorobicyclo-[2.2.1]-5-heptene-2,3-dicarboxylic acid,
the N-butyl imide of 5,6,7,8,9,9-hexachloro-1,2,3,4,4a,5,8,8a-octahydro-5,8-methano-2,3-naphthalenedicarboxylic acid,
the N-butyl imide of 5,6,7,8,9,9-hexachloro-1,2,3,4,4a,5,8a-octahydro-1,4,5,8-dimethano-2,3-naphthalenedicarboxylic acid,
the diethylenediamino imide of 1,4,5,6,7,7-hexachlorobicyclo-[2.2.1]-5-heptene-2,3-dicarboxylic acid,
the diethylenediamino imide of 5,6,7,8,9,9-hexachloro-1,2,3,4,4a,5,8,8a-octahydro-5,8-methano-2,3-naphthalenedicarboxylic acid,
the diethylenediamino imide of 5,6,7,8,9,9-hexachloro-1,2,3,4,4a,5,8,8a-octahydro-1,4,5,8-dimethano-2,3-naphthalenedicarboxylic acid,
the phenyleneamino imide of 1,4,5,6,7,7-hexachlorobicyclo-[2.2.1]-5-heptene-2,3-dicarboxylic acid,
the phenyleneamino imide of 5,6,7,8,9,9-hexachloro-1,2,3,4,4a,5,8,8a-octahydro-5,8-methano-2,3-naphthalenedicarboxylic acid,
the phenyleneamino imide of 5,6,7,8,9,9-hexachloro-1,2,3,4,4a,5,8,8a-octahydro-1,4,5,8-dimethano-2,3-naphthalenedicarboxylic acid,
1,2-bis(1,4,5,6,7,7-hexachlorobicyclo-[2.2.1]-5-heptene-2,3-dicarboximido)ethane,
1,2-bis(5,6,7,8,9,9-hexachloro-1,2,3,4,4a,8,8a-octahydro-5,8-methano-2,3-naphthalenedicarboximido)ethane,
1,2-bis(5,6,7,8,9,9-hexachloro-1,2,3,4,4a,5,8,8a-octahydro-1,4,5,8-dimethano-2,3-naphthalenedicarboximido)ethane,
1,3-bis(1,4,5,6,7,7-hexachlorobicyclo-[2.2.1]-5-heptene-2,3-naphthalenedicarboximido)-propane,
1,3-bis(5,6,7,8,9,9-hexachloro-1,2,3,4,4a,5,8,8a-octahydro-5,8-methano-2,3-naphthalenedicarboximido)propane,
1,3-bis(5,6,7,8,9,9-hexachloro-1,2,3,4,4a,5,8,8a-octahydro-1,4,5,8-dimethano-2,3-naphthalenedicarboximido)propane,
1,5-bis(1,4,5,7,7-hexachlorobicyclo-[2.2.1]-5-heptene-2,3-dicarboximido)-3-azapentane,
1,5-bis(5,6,7,8,9,9-hexachloro-1,2,3,4,4a,5,8,8a-octahydro-5,8-methano-2,3-naphthalenedicarboximido)-3-azapentane,
1,5-bis(5,6,7,8,9,9-hexachloro-1,2,3,4,4a,5,8,8a-octahydro-1,4,5,8-dimethano-2,3-naphthalenedicarboximido)-3-azapentane, etc.

It is to be understood that the aforementioned polychloro-substituted compounds which possess a chlorine content of at least 45% and a molecular weight of at least 350 are only representative of the class of compounds which may be used, and that the present invention is not necessarily limited thereto.

The second component of the novel composition of matter of the present invention will comprise polybromo-substituted organic compounds, said compounds being characterized by possessing a bromine content of at least 50% and having a molecular weight of at least 250. Some specific examples of these polybromo-substituted organic compounds will include fully or partially brominated,
vinylcyclohexene,
norbornadiene,
bis(cyclohexenyl)ethylene,
1,5-cyclooctadiene,
neopentylglycol tetraacrylate,
trimethylolpropane triacrylate, etc.,
hexabromobenzene,
1,2,5,6,9,10-hexabromocyclododecane,
octabromohexadecane,
hexabromocyclopentene,
heptabromocyclopentene,
hexabromocyclopentadiene,
hexabromocyclohexane,
hexabromocyclododecatriene,
pentabromotoluene, hexabromodiphenyl ether,
tetrabromobisphenol A,
dibromoneopentyl glycol,
hexabromobiphenyl,
1,4-bisallyloxy-2,3,5,6-tetrabromobenzene,
1,2-bisallyloxy-3,4,5,6-tetrabromobenzene,
hexabromooctane,
1,4,5,6,7,7-hexabromobicyclo[2.2.1]-5-heptene-2,3-dicarboxylic acid,
5,6,7,8,9,9-hexabromo-1,2,3,4,4a,5,8,8a-octahydro-5,8-methano-2,3-naphthalenedicarboxylic acid,
5,6,7,8,9,9-hexabromo-1,2,3,4,4a,5,8,8a-octahydro-1,4,5,8-dimethano-2,3-naphthalenedicarboxylic acid,
the monomethyl ester of 1,4,5,6,7,7-hexabromobicyclo-[2.2.1]-5-heptene-2,3-dicarboxylic acid,
the monoethyl ester of 1,4,5,6,7,7-hexabromobicyclo-[2.2.1]-5-heptene-2,3-dicarboxylic acid,
the dimethyl ester of 5,6,7,8,9,9-hexabromo-1,2,3,4,4a,5,8,8a-octahydro-5,8-methano-2,3-naphthalenedicarboxylic acid,
the diethyl ester of 5,6,7,8,9,9-hexabromo-1,2,3,4,4a,5,8,8a-octahydro-5,8-methano-2,3-naphthalenedicarboxylic acid,
the dimethyl ester of 5,6,7,8,9,9-hexabromo-1,2,3,4,4a,5,8,8a-octahydro-1,4,5,8-dimethano-2,3-naphthalenedicarboxylic acid,
the diethyl ester of 5,6,7,8,9,9-hexabromo-1,2,3,4,4a,5,8,8a-octahydro-1,4,5,8-dimethano-2,3-naphthalenedicarboxylic acid,
N-ethyl-1,4,5,6-tetrabromo-2,3-phthaloimide,
N-propyl-1,4,5,6,7,8-hexabromo-2,3-dicarboxynaphthylimide,
N-cyclopentyl-1,4,5,6,7,8-hexabromo-2,3-dicarboxynaphthylimide,
α,α'-bis(5,6,7,8,9,9-hexabromo-1,2,3,4,4a,5,8,8a-octahydro-5,8-methano-2,3-naphthalenedicarboximido)-2,3-tetrabromo-p-xylene,
4,4'-bis(1,4,5,6,7,7-hexabromobicyclo-[2.2.1]-5-heptene-2,3-dicarboximidomethyl)-2,2',3,3'5,5',6,6'-octabromodiphenyl ether,
4,4'-bis(5,6,7,8,9,9-hexabromo-1,2,3,4,4a,5,8,8a-octahydro-5,8,-methano-2,3-naphthalenedicarboximidomethyl)-2,2',3,3',5,5',6,6'-octabromodiphenyl ether,
2-N-(1,4,5,6,7,7-hexabromobicyclo-[2.2.1]-5-heptene-2,3-dicarboximido)-4,6-dibromo-s-triazine,
2-N-(5,6,7,8,9,9-hexabromo-1,2,3,4,4a,5,8,8a-octahydro-1,4,5,8-dimethano-2,3-naphthalenedicarboximido)-4,6-dibromo-s-triazine,
2-N-(5,6,7,8,9,9-hexabromo-1,2,3,4,4a,5,8,8a-octahydro-5,8-methano-2,3-naphthalenedicarboximido)-4,6-diphenyl-s-triazine,
2-N-(1,4,5,6,7,7-hexabromobicyclo-[2.2.1]-5-heptene-2,3-dicarboximido)-4,6-dicyclopentyl-s-triazine,
2-N-(5,6,7,8,9,9-hexabromo-1,2,3,4,4a,5,8,8a-octahydro-1,4,5,8-dimethano-2,3-naphthalenedicarboximido)-4,6-dicyclopentyl-s-triazine,
2,4-bis-[N-(5,6,7,8,9,9-hexabromo-1,2,3,4,4a,5,8,8a-octahydro-5,8-methano-2,3-naphthalenedicarboximido)]-6-bromo-s-triazine,
2,4-bis-[N-(1,4,5,6,7,7-hexabromobicyclo-[2.2.1]-5-heptene-2,3-dicarboximido)]-6-methyl-s-triazine,
2,4-bis-[N-(5,6,7,8,9,9-hexabromo-1,2,3,4,4a,5,8,8a-octahydro-1,4,5,8-dimethano-2,3-naphthalenedicarboximido)]-6-methyl-s-triazine,
2,4,6-tris-[N-(5,6,7,8,9,9-hexabromo-1,2,3,4,4a,5,8,8a-octahydro-5,8-methano-2,3-naphthalenedicarboximido)]-s-triazine,
the imide of 1,4,5,6,7,7-hexabromobicyclo-[2.2.1]-5-heptene-2,3-dicarboxylic acid,
the imide of 5,6,7,8,9,9-hexabromo-1,2,3,4,4a,5,8,8a-octahydro-1,4,5,8-dimethano-2,3-naphthalenedicarboxylic acid,
the N-methyl imide of 1,4,5,6,7,7-hexabromobicyclo-[2.2.1]-5-heptene-2,3-dicarboxylic acid,
the N-methyl imide of 5,6,7,8,9,9-hexabromo-1,2,3,4,4a,5,8,8a-octahydro-5,8-methano-2,3-naphthalenedicarboxylic acid,
the N-ethyl imide of 1,4,5,6,7,7-hexabromobicyclo-[2.2.1]-5-heptene-2,3-dicarboxylic acid,
the N-ethyl imide of 5,6,7,8,9,9-hexabromo-1,2,3,4,4a,5,8,8a-octahydro-1,4,5,8-dimethano-2,3-naphthalenedicarboxcylic acid,
the N-butyl imide of 5,6,7,8,9,9-hexabromo-1,2,3,4,4a,5,8,8a-octahydro-5,8-methano-2,3-naphthalenedicarboxylic acid,
the diethylenediamino imide of 1,4,5,6,7,7-hexabromobicyclo-[2.2.1]-5-heptene-2,3-dicarboxylic acid,
the diethylenediamino imide of 5,6,7,8,9,9-hexabromo-1,2,3,4,4a,5,8,8a-octahydro-1,4,5,8-dimethano-2,3-naphthalenedicarboxylic acid,
the phenyleneamino imide of 5,6,7,8,9,9-hexabromo-1,2,3,4,4a,8,8a-octahydro-5,8-methano-2,3-naphthalenedicarboxylic acid,
1,2-bis-(1,4,5,6,7,7-hexabromobicyclo-[2.2.1]-5-heptene-2,3-dicarboximido)-ethane,
1,2-bis-(5,6,7,8,9,9-hexabromo-1,2,3,4,4a,5,8,8a-octahydro-1,4,5,8-dimethano-2,3-napthalenedicarboximido)ethane,
1,3-bis-(1,4,5,6,7,7-hexabromobicyclo-[2.2.1]-5-heptene-2,3-naphthalenedicarboximido)-propane,
1,3-bis(5,6,7,8,9,9-hexabromo-1,2,3,4,4a,5,8,8a-octahydro-1,4,5,8-dimethano-2,3-naphthalenedicarboximido) propane, etc.

It is to be understood that the aforementioned bromine-containing compounds are only representative of the class of organic compounds which may be used, and that the present invention is not necessarily limited thereto.

In addition to the aforementioned polychloro-substituted and polybromo-substituted organic compounds, the novel flame retardant compositions of matter of the present invention will also include an atimony-containing or tin-containing compound. Some representative examples of these antimony-containing compounds and tin-containing compounds will include antimony trioxide, antimony oxychloride, trimethyl antimony, triethyl antimony, tripropyl antimony, tributyl antimony, triamyl antimony, triphenyl antimony, tribenzyl antimony, trimethyl antimony trichloride, triethyl antimony trichloride, tripropyl antimony trichloride, tributyl antimony trichloride, triphenyl antimony trichloride, tribenzyl antimony trichloride, trimethyl antimony sulfide, triethyl antimony sulfide, tripropyl antimony sulfide, tributyl antimony sulfide, triphenyl antimony sulfide, tribenzyl antimony sulfide, the corresponding alkoxy, dialkoxy and trialkoxy antimony derivatives, antimony derivatives of polyols including the glycols and glycerides, etc., stannous oxide, stannic oxide, stannous chloride, stannic chloride, stannous sulfide, stannic sulfide, dimethyl tin, tetramethyl tin, diethyl tin, tetraethyl tin, dipropyl tin, tetrapropyl tin, dibutyl tin, tetrabutyl tin, dibenzyl tin, tetrabenzyl tin, dimethyl tin sulfide, diethyl tin sulfide, dipropyl tin sulfide, dibutyl tin sulfide, diphenyl tin sulfide, dibenzyl tin sulfide, monoethyl tin triacetate, mono-propyl tin triacetate, mono-butyl tin triacetate, dimethyl tin diacetate, diethyl tin diacetate, dipropyl tin diacetate, dibutyl tin diacetate, trimethyl tin acetate, triethyl tin acetate, tripropyl tin acetate, tributyl tin acetate, mono-methyl tin tripropionate, mono-ethyl tin tripropionate, mono-propyl tin tripropionate, mono-butyl tin tripropionate, dimethyl tin dipropionate, diethyl tin dipropionate, dipropyl tin dipropionate, dibutyl tin dipropionate, trimethyl tin propionate, triethyl tin propionate, tripropyl tin propionate, tributyl tin propionate, dimethyl tin dimaleate, diethyl tin dimaleate, dipropyl tin dimaleate, dibutyl tin dimaleate, dimethyl tin diadipates, diethyl tin diadipates, dipropyl tin diadipates, dibutyl tin diadipates, dimethyl tin disuccinates, diethyl tin disuccinates, dipropyl tin disuccinates, dibutyl tin disuccinates, dimethyl tin dimalonates, diethyl tin dimalonates, dipropyl tin dimalonates, dibutyl tin dimalonates, dibutyl tin diaconite, phenyl tin trichloride, diphenyl tin dichloride, diphenyl tin oxide, triphenyl vinyl tin chloride, triphenyl tin chloride, triphenyl tin acetate, diphenyl tin acetate, hexaphenyl tin acetate, hexabutyl tin acetate, dilauryl tin dichloride, tetralauryl tin dichloride, benzyl tin trichloride, dibenzyl tin dichloride, tribenzyl tin chloride, tetravinyl tin chloride, tetraallyl tin chloride, etc., diphenyl tin oxide, dimethyl tin oxide, dipropyl tin oxide, dibutyl tin oxide, etc., including various reaction products of dialkyl tin oxides such as dibutyl tin oxide with various mercaptanes, mercapto esters or with dibasic acids and mercaptanes, alcohols and/or mercapto esters, etc.

The novel compositions of matter of the present invention which possess the desirable characteristics of an enhanced flame retardant are prepared by admixing the polymeric substance, the polychloro-substituted organic compound, the polybromo-substituted organic compound and the antimony-containing or tin-containing compound in any conventional manner. For example, depending upon the physical form of the polymeric substance which is thermoplastic in nature, all of the components of the novel composition of matter may be mixed in a mixer, may be milled or may be extruded through a suitable apparatus after admixing to thus prepare the desired compound. It is contemplated that any mode of admixing the components which is known in the art may be used, the above methods being merely set forth as illustrative examples of possible ways in which the novel flame retardant composition of matter may be formed. In the preferred embodiment of the invention, the polychloro-substituted organic compound and the polybromo-substituted organic compound will be present, in combination, in the finished composition of matter in an amount of from about 5 to about 50% by weight of the finished product, the antimony-containing or tin-containing compound will be present in an amount ranging from about 0.2 up to about 15% by weight of the finished composition of matter and the polymeric substance will be present in an amount ranging from about 50 to about 94.8% by weight.

Some representative illustrative examples of the novel flame retardant compositons of matter of the present invention will include polyethylene, 1,4,5,6,7,7-hexachlorobicyclo-[2.2.1]-5-heptene-2,3-dicarboxylic acid, 1,2,5,6,9,10-hexabromocyclododecane and antimony trioxide;
polypropylene, 1,4,5,6,7,7-hexachlorobicyclo-[2.2.1]-5-heptene-2,3-dicarboxylic acid, 1,2,5,6,9,10-hexabromocyclododecane and antimony trioxide;
polystyrene 1,4,5,6,7,7-hexachlorobicyclo-[2.2.1]-5-heptene-2,3-dicarboxylic acid, 1,2,5,6,9,10-hexabromocyclododecane and antimony trioxide;
ABS, 1,4,5,6,7,7-hexachlorobicyclo-[2.2.1]-5-heptene-2,3-dicarboxylic acid, 1,2,5,6,9,10-hexabromocyclododecane and antimony trioxide;
polyurethane 1,4,5,6,7,7-hexachlorobicyclo-[2.2.1]-5-heptene-2,3-dicarboxylic acid, 1,2,5,6,9,10-hexabromocyclododecane and antimony trioxide;
polyphenyl ether, 1,4,5,6,7,7-hexachlorobicyclo-[2.2.1]-5-heptene-2,3-dicarboxylic acid, 1,2,5,6,9,10-hexabromocyclododecane and antimony trioxide;
polyethylene, 5,6,7,8,9,9-hexachloro-1,2,3,4,4a,5,8,8a-octahydro-5,8-methano-2,3-naphthalenedicarboxylic anhydride 1,2,5,6,9,10-hexabromocyclododecane and antimony trioxide;
polypropylene, 5,6,7,8,9,9-hexachloro-1,2,3,4,4a,5,8,8a-octahydro-5,8-methano-2,3-naphthalenedicarboxylic anhydride, 1,2,5,6,9,10-hexabromocyclododecane and antimony trioxide;
polystyrene, 5,6,7,8,9,9-hexachloro-1,2,3,4,4a,5,8,8a-octahydro-5,8-methano-2,3-naphthalenedicarboxylic anhydride, 1,2,5,6,9,10-hexabromocyclododecane and antimony trioxide;
ABS, 5,6,7,8,9,9-hexachloro-1,2,3,4,4a,5,8,8a-octahydro-5,8-methano-2,3-naphthalenedicarboxylic anhydride 1,2,5,6,9,10-hexabromocyclododecane, and antimony trioxide;
polyurethane, 5,6,7,8,9,9-hexachloro-1,2,3,4,4a,5,8,8a-octahydro-5,8-methano-2,3-naphthalenedicarboxylic anhydride, 1,2,5,6,9,10-hexabromocyclododecane and antimony trioxide;
polyethylene, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene,1,2,5,6,9,10-hexabromocyclododecane and antimony trioxide;
polypropylene, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, 1,2,5,6,9,10-hexabromocyclododecane and antimony trioxide;
polystyrene, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, 1,2,5,6,9,10-hexabromocyclododecane and antimony trioxide;
ABS, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, 1,2,5,6,9,10-hexabromocyclododecane and antimony trioxide;
polyurethane, 1,4,5,10-dimethanocycloocta-1,2,3,4,7,8,9,10,13,14,14-dodecachloro-1,4,4a,5,6,6a,7,10,10a,11,12,12a-dodecahydro-[1,2,5,6]-dibenzene 1,2,5,6 9,10-hexabromocyclododecane and antimony trioxide;
polyphenyl ether, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, 1,2,5,6,9,10-hexabromocyclododecane and antimony trioxide;
polyethylene, 1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
polypropylene, 1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
polystyrene, 1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
ABS,1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
polyurethane, 1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
polyphenyl ether, 1,4,6,9-dimethano-1,2,3,4,6,7,8,9,10,10a,11,11a-dodecachloro-1,4,4a,5,5a,9,9a,9b-octahydrodibenzofuran, 1,2,5,6,9,10-hexabromocyclododecane and antimony trioxide;
polyethylene, the monomethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polypropylene, the monomethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polystyrene, the monomethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
ABS, the monoethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane, and antimony trioxide;

polyurethane, the monomethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polyphenyl ether, the monomethyl ester of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polyethylene, guanyl-1,4,5,6,7,7-hexachlorobicyclo-[2.2.1]-5-heptene-2,3-dicarboximide, 1,2,5,6,9,10-hexabromocyclododecane and antimony trioxide;
polypropylene, guanyl-1,4,5,6,7,7-hexachlorobicyclo-[2.2.1]-5-heptene-2,3-dicarboximide, 1,2,5,6,9,10-hexabromocyclododecane and antimony trioxide;
polystyrene, guanyl-1,4,5,6,7,7-hexachlorobicyclo-[2.2.1]-5-heptene-2,3-dicarboximide, 1,2,5,6,9,10-hexabromocyclododecane and antimony trioxide;
ABS, guanyl-1,4,5,6,7,7-hexachlorobicyclo-[2.2.1]-5-heptene-2,3-dicarboximide, 1,2,5,6,9,10-hexabromocyclododecane and antimony trioxide;
polyurethane, guanyl-1,4,5,6,7,7-hexachlorobicyclo-[2.2.1]-5-heptene-2,3-dicarboximide, 1,2,5,6,9,10-hexabromocyclododecane and antimony trioxide;;
polyphenyl ether, guanyl-1,4,5,6,7,7-hexachlorobicyclo-[2.2.1]-5-heptene-2,3-dicarboximide, 1,2,5,6,9,10-hexabromocyclododecane and antimony trioxide;
polyethylene, N-ethyl-1,4,5,6-tetrachloro-2,3-phthaloimide, 1,2,5,6,9,10-hexabromocyclododecane and antimony trioxide;
polypropylene, N-ethyl-1,4,5,6-tetrachloro-2,3-phthaloimide, 1,2,5,6,9,10-hexabromocyclododecane, and antimony trioxide;
polystyrene, N-ethyl-1,4,5,6-tetrachloro-2,3-phthaloimide, 1,2,5,6,9,10-hexabromocyclododecane and antimony trioxide;
ABS, N-ethyl-1,4,5,6-tetrachloro-2,3-phthaloimide, 1,2,5,6,9,10-hexabromocyclododecane and antimony trioxide;
polyurethane, N-ethyl-1,4,5,6-tetrachloro-2,3-phthaloimide, 1,2,5,6,9,10-hexabromocyclododecane, and antimony trioxide;
polyphenyl ether, N-ethyl-1,4,5,6-tetrachloro-2,3-phthaloimide, 1,2,5,6,9,10-hexabromocyclododecane, and antimony trioxide;
polyethylene, 2-N-(5,6,7,8,9,9-hexachloro-1,2,3,4,4a,5,8,8a-octahydro-5,8-methano-2,3-naphthalenedicarboxamido)-4,6-dichloro-s-triazine, 1,2,5,6,9,10-hexabromocyclododecane and antimony trioxide;
polypropylene, 2-N-(5,6,7,8,9,9-hexachloro-1,2,3,4,4a,5,8,8a-octahydro-5,8-methano-2,3-naphthalenedicarboximido)-4,6-dichloro-s-triazine, 1,2,5,6,9,10-hexabromocyclododecane and antimony trioxide;
polystyrene, 2-N-(5,6,7,8,9,9-hexachloro-1,2,3,4,4a,5,8,8a-octahydro-5,8-methano-2,3-naphthalenedicarboximido)-4,6-dichloro-s-triazine, 1,2,5,6,9,10-hexabromocyclododecane and antimony trioxide;
ABS, 2-N-(5,6,7,8,9,9-hexachloro-1,2,3,4,4a,5,8,8a-octahydro-5,8-methano-2,3-naphthalenedicarboximido)-4,6-dichloro-s-triazine, 1,2,5,6,9,10-hexabromocyclododecane and antimony trioxide;
polyurethane, 2-N-(5,6,7,8,9,9-hexachloro-1,2,3,4,4a,5,8,8a-octahydro-5,8-methano-2,3-naphthalenedicarboximido)-4,6-dichloro-s-triazine, 1,2,5,6,9,10-hexabromocyclododecane and antimony trioxide;
polyphenyl ether, 2-N-(5,6,7,8,9,9-hexachloro-1,2,3,4,4a,5,8,8a-octahydro-5,8-methano-2,3-naphthalenedicarboximido)-4,6-dichloro-s-triazine, 1,2,5,6,9,10-hexabromocyclododecane and antimony trioxide;
polyethylene, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polypropylene, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polystyrene, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
ABS, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane and antimony trioxide;
polyurethane, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane, and antimony trioxide;
polyphenyl ether, the N-methyl imide of 5,6,7,8,9,9-hexachloro-1,2,3,4,4a,5,8,8a-octahydro-5,8-methano-2,3-naphthalenedicarboxylic acid, 1,2,5,6,9,10-hexabromocyclododecane, and antimony trioxide;
polyethylene, 1,4,5,6,7,7-hexachlorobicyclo-[2.2.1]-5-heptene-2,3-dicarboxylic acid, hexabromobiphenyl, and antimony trioxide;
polypropylene, 1,4,5,6,7,7-hexachlorobicyclo-[2.2.1]-5-heptene-2,3-naphthalenedicarboxylic acid, hexabromobiphenyl and antimony trioxide;
polystyrene, 1,4,5,6,7,7-hexachlorobicyclo-[2.2.1]-5-heptene-2,3-dicarboxylic acid, hexabromobiphenyl and antimony trioxide;
ABS, 1,4,5,6,7,7-hexachlorobicyclo-[2.2.1]-5-heptene-2,3-dicarboxylic acid, hexabromobiphenyl and antimony trioxide;
polyurethane, 1,4,5,6,7,7-hexachlorobicyclo-[2.2.1]-5-heptene-2,3-dicarboxylic acid, hexabromobiphenyl and antimony trioxide;
polyphenyl ether, 1,4,5,6,7,7-hexachlorobicyclo-[2.2.1]-5-heptene-2,3-dicarboxylic acid, hexabromobiphenyl and antimony trioxide;
polyethylene, 5,6,7,8,9,9-hexachloro-1,2,3,4,4a,5,8,8a-octahydro-5,8-methano-2,3-naphthalenedicarboxylic anhydride, hexabromobiphenyl and antimony trioxide;
polypropylene, 5,6,7,8,9,9-hexachloro-1,2,3,4,4a,5,8,8a-octahydro-5,8-methano-2,3-naphthalenedicarboxylic anhydride, hexabromobiphenyl, and antimony trioxide;
polystyrene, 5,6,7,8,9,9-hexachloro-1,2,3,4,4a,5,8,8a-octahydro-5,8-methano-2,3-naphthalenedicarboxylic anhydride, hexabromobiphenyl and antimony trioxide;
ABS, 5,6,7,8,9,9-hexachloro-1,2,3,4,4a,5,8,8a-octahydro-5,8-methano-2,3-naphthalenedicarboxylic anhydride, hexabromobiphenyl and antimony trioxide;
polyurethane, 5,6,7,8,9,9-hexachloro-1,2,3,4,4a,5,8,8a-octahydro-5,8-methano-2,3-naphthalenedicarboxylic anhydride, hexabromobiphenyl and antimony trioxide;
polyethylene, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, hexabromobiphenyl and antimony trioxide;
polypropylene, 1,4,5,10-dimethanocycloocta-1,2,3,4,7,8,9,10,13,13,14,14-dodecachloro-1,4,4a,5,6,6a-7,10,10a,11,12,12a-dodecahydro-[1,2,5,6]-dibenzene, hexabromobiphenyl and antimony trioxide;
polystyrene, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, hexabromobiphenyl and antimony trioxide;
ABS, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, hexabromobiphenyl and antimony trioxide;
polyurethane, 1,4,5,10-dimethanocycloocta-1,2,3,4,7,8,9,10,13,13,14,14-dodecachloro-1,4,4a,5,6,6a,7,10,10a,11,12,12a-dodecahydro-[1,2,5,6]-dibenzene, hexabromobiphenyl and antimony trioxide;

polyphenyl ether, 1,4,5,10-dimethanocycloocta-1,2,3,4,7,
8,9,10,13,13,14,14-dodecachloro-1,4,4a,5,6,6a,7,10,
10a,11,12,12a-dodecahydro-[1,2,5,6]-dibenzene,
hexabromobiphenyl and antimony trioxide;
polyethylene, 1,4,6,9-dimethano-1,2,3,4,6,7,8,9,10,10a,11,
11a-dodecachloro-1,4,4a,5,5a,9,9a,9b-octahydrodibenzofuran, hexabromobiphenyl and antimony trioxide;
polypropylene, 1,4,6,9-dimethano-1,2,3,4,6,7,8,9,10,10a,
11,11a-dodecachloro-1,4,4a,5,5a,9,9a,9b-octahydrodibenzofuran, hexabromobiphenyl and antimony trioxide;
polystyrene, 1,4,6,9-dimethano-1,2,3,4,6,7,8,9,10,10a,11,
11a-dodecachloro-1,4,4a,5,5a,9,9a,9b-octahydrodibenzofuran, hexabromobiphenyl and antimony trioxide;
ABS, 1,4,6,9-dimethano-1,2,3,4,6,7,8,9,10,10a,11,11a-dodecachloro-1,4,4a,5,5a,9,9a,9b-octahydrodibenzofuran, hexabromobiphenyl and antimony trioxide;
polyurethane, 1,4,6,9-dimethano-1,2,3,4,6,7,8,9,10,10a,11,
11a-dodecachloro-1,4,4a,5,5a,9,9a,9b-octahydrodibenzofuran, hexabromobiphenyl and antimony trioxide;
polyphenyl ether, 1,4,6,9-dimethano-1,2,3,4,6,7,8,9,10,10a,
11,11a-dodecachloro-1,4,4a,5,5a,9,9a,9b-octahydrodibenzofuran, hexabromobiphenyl and antimony trioxide;
polyethylene, the monomethyl ether of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polypropylene, the monomethyl ester of 5,6,7,8,9,9a-hexachloro-1,2,3,4,4a,5,8,8a-octahydro-5,8-methano-2,3-naphthalenedicarboxylic acid, hexabromobiphenyl and antimony trioxide;
polystyrene, the monomethyl ether of 5,6,7,8,9,9-hexachloro-1,2,3,4,4a,5,8,8a-octahydro-5,8-methano-2,3-naphthalenedicarboxylic acid, hexabromobiphenyl and antimony trioxide;
ABS, the monomethyl ester of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polyurethane, the monomethyl ester of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polyphenyl ether, the monomethyl ester of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polyethylene, guanyl-1,4,5,6,7,7-hexachlorobicyclo-[2.2.1]-5-heptene-2,3-dicarboximide, hexabromobiphenyl and antimony trioxide;
polypropylene, guanyl-1,4,5,6,7,7-hexachlorobicyclo-[2.2.1]-5-heptene-2,3-dicarboximide, hexabromobiphenyl and antimony trioxide;
polystyrene, 1,4,5,6,7,7-hexachlorobicyclo-[2.2.1]-5-heptene-2,3-dicarboximide, hexabromobiphenyl and antimony trioxide;
ABS, guanyl-1,4,5,6,7,7-hexachlorobicyclo-[2.2.1]-5-heptene-2,3-dicarboximide, hexabromobiphenyl and antimony trioxide;
polyurethane, guanyl-1,4,5,6,7,7-hexachlorobicyclo-[2.2.1]-5-heptene-2,3-dicarboximide, hexabromobiphenyl and antimony trioxide;
polyphenyl ether, guanyl-1,4,5,6,7,7-hexachlorobicyclo-[2.2.1]-5-heptene-2,3-dicarboximide, hexabromobiphenyl and antimony trioxide;
polyethylene, N-ethyl-1,4,5,6-tetrachloro-2,3-phthalo-imide, hexabromobiphenyl and antimony trioxide;
polypropylene, N-ethyl-1,4,5,6-tetrachloro-2,3-phthalo-imide, hexabromobiphenyl and antimony trioxide;
polystyrene, N-ethyl-1,4,5,6-tetrachloro-2,3-phthaloimide, hexabromobiphenyl and antimony trioxide;
ABS, N-ethyl-1,4,5,6-tetrachloro-2,3-phthaloimide, hexabromobiphenyl and antimony trioxide;
polyurethane, N-ethyl-1,4,5,6-tetrachloro-2,3-phthalo-imide, hexabromobiphenyl and antimony trioxide;
polyphenyl ether, N-ethyl-1,4,5,6-tetrachloro-2,3-phthaloimide, hexabromobiphenyl and antimony trioxide;
polyethylene, 2-N-(5,6,7,8,9,9-hexachloro-1,2,3,4,4a,5,8,8a-octahydro-5,8-methano-2,3-naphthalenedicarboximido)-4,6-dichloro-s-triazine, hexabromobiphenyl and antimony trioxide;
polypropylene, 2-N-(5,6,7,8,9,9-hexachloro-1,2,3,4,4a,5,8,8a-octahydro-5,8-methano-2,3-naphthalenedicarboximido)-4,6-dichloro-s-triazine, hexabromobiphenyl and antimony trioxide;
polystyrene, 2-N-(5,6,7,8,9,9-hexachloro-1,2,3,4,4a,5,8,8a-octahydro-5,8-methano-2,3-naphthalenedicarboximido)-4,6-dichloro-s-triazine, hexabromobiphenyl and antimony trioxide;
ABS, 2-N-(5,6,7,8,9,9-hexachloro-1,2,3,4,4a,5,8,8a-octahydro-5,8-methano-2,3-naphthalenedicarboximido)-4,6-dichloro-s-triazine, hexabromobiphenyl and antimony trioxide;
polyurethane 2-N-(5,6,7,8,9,9-hexachloro-1,2,3,4a,5,8,8a-octahydro-5,8-methano-2,3-naphthalenedicarboximido)-4,6-dichloro-s-triazine, hexabromobiphenyl and antimony trioxide;
polyphenyl ether, 2-N-(5,6,7,8,9,9-hexachloro-1,2,3,4,4a 5,8,8a-octahydro-5,8-methano-2,3-naphthalenedicarboximido)-4,6-dichloro-s-triazine, hexabromobiphenyl and antimony trioxide;
polyethylene, the N-methyl imide of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polypropylene, the N-methyl imide of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polystyrene, the N-methyl imide of 5,6,7,8,9,9-hexachloro-1,2,3,4,4a,5,8,8a-octahydro-5,8-methano-2,3-naphthalenedicarboxylic acid, hexabromobiphenyl and antimony trioxide;
ABS, the N-methyl imide of 5,6,7,8,9,9-hexachloro-1,2,3,4,4a,5,8a-octahydro-5,8-methano-2,3-naphthalenedicarboxylic acid, hexabromobiphenyl and antimony trioxide;
polyurethane, the N-methyl imide of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polyphenyl ether, the N-methyl imide of 5,6,7,8,9,9-hexachloro-1,2,3,4,4a,5,8,8a-octahydro-5,8-methano-2,3-naphthalenedicarboxylic acid, hexabromobiphenyl and antimony trioxide;
polyethylene, 1,4,5,6,7,7-hexachlorobicyclo-[2.2.1]-5-heptene-2,3-dicarboxylic acid, hexabromodiphenyl ether and antimony trioxide;
polypropylene, 1,4,5,6,7,7-hexachlorobicyclo-[2.2.1]-5-heptene-2,3-dicarboxylic acid, hexabromodiphenyl ether and antimony trioxide;
polystyrene, 1,4,5,6,7,7-hexachlorobicyclo-[2.2.1]-5-heptene-2,3-dicarboxylic acid, hexabromodiphenyl ether and antimony trioxide;
ABS, 1,4,5,6,7,7-hexachlorobicyclo-[2.2.1]-5-heptene-2,3-dicarboxylic acid, hexabromodiphenyl ether and antimony trioxide;
polyurethane, 1,4,5,6,7,7-hexachlorobicyclo-[2.2.1]-5-heptene-2,3-dicarboxylic acid, hexabromodiphenyl ether and antimony trioxide;
polyphenyl ether, 1,4,5,6,7,7-hexachlorobicyclo-[2.2.1]-5-heptene-2,3-dicarboxylic acid, hexabromodiphenyl ether and antimony trioxide;
polyethylene, 5,6,7,8,9,9-hexachloro-1,2,3,4,4a,5,8,8a-octahydro-5,8-methano-2,3-naphthalenedicarboxylic anhydride, hexabromodiphenyl ether and antimony trioxide;
polypropylene, 5,6,7,8,9,9-hexachloro-1,2,3,4,4a,5,8,8a-octahydro-5,8-methano-2,3-naphthalenedicarboxylic anhydride, hexabromodiphenyl ether and antimony trioxide;

polystyrene, 5,6,7,8,9,9 - hexachloro-1,2,3,4,4a,5,8,8a-octahydro-5,8-methano - 2,3 - naphthalenedicarboxylic anhydride, hexabromodiphenyl ether and antimony trioxide;

ABS, 5,6,7,8,9,9 - hexachloro - 1,2,3,4,4a,5,8,8a-octahydro-5,8 - methano - 2,3-naphthalenedicarboxylic anhydride, hexabromodiphenyl ether and antimony trioxide;

polyurethane, 5,6,7,8,9,9 - hexachloro-1,2,3,4,4a,5,8,8a-octahydro - 5,8-methano - 2,3-naphthalenedicarboxylic anhydride, hexabromodiphenyl ether and antimony trioxide;

polyethylene, 1,4,5,10 - dimethanocycloocta-1,2,3,4,7,8,9,10,13,13,14,14 - dodecachloro - 1,4,4a,6,6a,7,10,10a,11,12,12a - dodecahydro-[1,2,5,6]-dibenzene, hexabromodiphenyl ether and antimony trioxide;

polypropylene, 1,4,5,10 - dimethanocycloocta-1,2,3,4,7,8,9,10,13,13,14,14 - dodecachloro - 1,4,4a,5,6,6a,7,10,10a,11,12,12a,dodecahydro - [1,2,5,6]-dibenzene, hexabromodiphenyl ether and antimony trioxide;

polystyrene, 1,4,5,10 - dimethanocycloocta-1,2,3,4,7,8,9,10,13,13,14,14 - dodecachloro - 1,4,4a,5,6,6a,7,10,10a,11,12,12a-dodecahydro - [1,2,5,6]-dibenzene, hexabromodiphenyl ether and antimony trioxide;

ABS, 1,4,5,10 - dimethanocycloocta-1,2,3,4,7,8,9,10,13,13,14,14 - dodecachloro - 1,4,4a,5,6,6a,7,10,10a,11,12,12a-dodecahydro - [1,2,5,6] - dibenzene, hexabromodiphenyl ether and antimony trioxide;

polyurethane, 1,4,5,10 - dimethanocycloocta-1,2,3,4,7,8,9,10,13,13,14,14 - dodecachloro - 1,4,4a,5,6,6a,7,10,10a,11,12,12a - dodecahydro - [1,2,5,6] - dibenzene, hexabromodiphenyl ether and antimony trioxide;

polyphenyl ether, 1,4,5,10 - dimethanocycloocta-1,2,3,4,7,8,9,10,13,13,14,14 - dodecachloro - 1,4,4a,5,6,6a,7,10,10a,11,12,12a - dodecahydro - [1,2,5,6]-dibenzene, hexabromodiphenyl ether and antimony trioxide;

polyethylene, 1,4,6,9-dimethano - 1,2,3,4,6,7,8,9,10,10a,11,11a-dodecachloro - 1,4,4a,5,5a,9,9a,9b - octahydrodibenzofuran, hexabromodiphenyl ether and antimony trioxide;

polypropylene, 1,4,6,9-dimethano - 1,2,3,4,6,7,8,9,10,10a,11,11a - dodecachloro - 1,4,4a,5,5a,9,9a,9b-octahydrodibenzofuran, hexabromodiphenyl ether and antimony trioxide;

polystyrene, 1,4,6,9-dimethano - 1,2,3,4,6,7,8,9,10,10a,11,11a - dodecachloro - 1,4,4a,5,5a,9,9a,9b-octahydrodibenzofuran, hexabromodiphenyl ether and antimony trioxide;

ABS, 1,4,6,9 - dimethano - 1,2,3,4,6,7,8,9,10,10a,11,11a-dodecachloro - 1,4,4a,5,5a,9,9a,9b - octahydrodibenzofuran, hexabromodiphenyl ether and antimony trioxide;

polyurethane, 1,4,6,9 - dimethano-1,2,3,4,6,7,8,9,10,10a,11,11a - dodecachloro - 1,4,4a,5,5a,9,9a,9b-octahydrodibenzofuran, hexabromodiphenyl ether and antimony trioxide;

polyphenyl ether, 1,469 - dimethano - 1,2,3,4,6,7,8,9,10,10a,11,11a-dodecachloro - 1,4,4a,5,5a,9,9a,9b-octahydrodibenzofuran, hexabromodiphenyl ether and antimony trioxide;

polyethylene, the monomethyl ester of 5,6,7,8,9,9-hexachloro - 1,2,3,4,4a,5,8,8a - octahydro-5,8-methano-2,3-naphthalenedicarboxylic acid, hexabromodiphenyl ether and antimony trioxide;

polypropylene, the monomethyl ester of 5,6,7,8,9,9-hexachloro - 1,2,3,4,4a,5,8,8a - octahydro-5,8-methano-2,3-naphthalenedicarboxylic acid, hexabromodiphenyl ether and antimony trioxide;

polystyrene, the monomethyl ester of 5,6,7,8,9,9-hexachloro - 1,2,3,4,4a,5,8,8a - octahydro-5,8-methano-2,3-naphthalenedicarboxylic acid, hexabromodiphenyl ether and antimony trioxide;

ABS, the monomethyl ester of 5,6,7,8,9,9-hexachloro-1,2,3,4,4a,5,8,8a - octahydro - 5,8-methano-2,3-naphthalenedicarboxylic acid, hexabromodiphenyl ether and antimony trioxide;

polyurethane, the monomethyl ester of 5,6,7,8,9,9-hexachloro-1,2,3,4,4a,5,8,8a - octahydro - 5,8-methano-2,3-naphthalenedicarboxylic acid, hexabromodiphenyl ether and antimony trioxide;

polyphenyl ether, the monomethyl ester of 5,6,7,8,9,9-hexachloro - 1,2,3,4,4a,5,8,8a - octahydro-5,8-methano-2,3-naphthalenedicarboxylic acid, hexabromodiphenyl ether and antimony trioxide;

polyethylene, guanyl - 1,4,5,6,7,7 - hexachlorobicyclo-[2.2.1] - 5 - heptene-2,3-dicarboximide, hexabromodiphenyl ether and antimony trioxide;

polypropylene, guanyl - 1,4,5,6,7,7 - hexachlorobicyclo-[2.2.1]-5 - heptene - 2,3-dicarboximide, hexabromodiphenyl ether and antimony trioxide;

polystyrene, 1,4,5,6,7,7 - hexachlorobicyclo - [2.2.1]-5-heptene-2,3 - dicarboximide, hexabromodiphenyl ether and antimony trioxide;

ABS, guanyl - 1,4,5,6,7,7 - hexachlorobicyclo-[2.2.1]-5-heptene-2,3-dicarboximide, hexabromodiphenyl ether and antimony trioxide;

polyurethane, guanyl - 1,4,5,6,7,7 - hexachlorobicyclo-[2.2.1]-5-heptene - 2,3 - dicarboximide, hexabromodiphenyl ether and antimony trioxide;

polyphenyl ether, guanyl-1,4,5,6,7,7 - hexachlorobicyclo-[2.2.1]-5-heptene - 2,3-dicarboximide, hexabromodiphenyl ether and antimony trioxide, etc.

It is to be understood that the aforementioned novel compositions of matter of the present invention are only representative of the class of compositions of matter which are contemplated to be within the scope hereinbefore set forth, and that the present invention is not necessarily limited thereto.

The following examples are given to illustrate the novel compositions of matter of the present invention. However, these examples are not intended to limit the generally broad scope of the present invention in strict accordance therewith.

EXAMPLE I

In this example, a novel composition of matter of the present invention was prepared by admixing 100 parts of a commercial high molecular weight polypropylene, 10 parts of antimony trioxide and 25 parts of a mixture of tetrabromobisphenol A and 5,6,7,8,9,9-hexachloro-1,2,3,4,4a,5,8,8a-octahydro-5,8-methano - 2,3 - naphthalenedicarboxylic anhydride, the latter two compounds being present in said mixture in an amount so that the mixture contained a chlorine to bromine ratio of 7.5:2.5. Following the physical admixture of the components of the finished composition of matter, the composition of matter was extruded and formed into flat rectangular strips. In addition, other milled compositions of matter were cut and pressed into other strips which contained a glass cloth in the center to prevent dripping. To illustrate the improved flame retardant properties of the novel composition of matter of the present invention other samples were prepared and subjected to flame retardant tests which are hereinafter described in further detail. The strip comprising the novel composition of matter of the present invention was labeled "A." A second set of strips was prepared by admixing 100 parts of a high molecular weight polypropylene, 25 parts of tetrabromobisphenol-A, and 10 parts of antimony trioxide, these strips were labeled "B." A third set of strips was prepared by admixing 100 parts of a commercial high molecular weight polypropylene, 10 parts of antimony trioxide and 25 parts of 5,6,7,8,9,9-hexachloro - 1,2,3,4,4a,5,8,8a - octahydro-5,8-methano-2,3-naphthalenedicarboxylic anhydride, said strips being labeled "C." As a control, a set of strips was prepared which comprised only the commercial high molecular weight polypropylene said strips being labeled "D." Following this the strips were subjected to an oxygen index combustion test utilizing an apparatus similar to the one described by C. P. Fenimore and F. J. Martin in the November 1966 issue of Modern Plastics. The results of this test which measure the oxygen index (the lowest mol fraction of oxygen which is sufficient to maintain combustion) are set forth in Table I below.

TABLE I

| Strip: | Oxygen index |
|---|---|
| A | 0.274 |
| B | 0.236 |
| C | 0.257 |
| D | 0.180 |

It is to be noted from the above table that the strips comprising the novel composition of matter of the present invention possesses an oxygen index far superior to that which is possessed by the other strips, thus indicating the synergistic effect of combining a polybromo-substituted organic compound and a polychloro-substituted organic compound with a thermoplastic compound and antimony trioxide.

A second series of tests were performed in conformity with the tests known as Underwriters Laboratories Test Subject 94 or 746. In this test, a flat rectangular specimen of material is prepared measuring approximately 5 inches long by 0.5 inch wide. Three specimens are aged in a full-draft circulating air oven for 168 hours at a temperature of approximately 70° C. Immediately after completion of the 168 hour time period, the specimens are removed from the oven and cooled over calcium chloride in a desiccator for at least 4 hours at room temperature before being tested. In addition, three identical unaged specimens are also tested.

In performing the test, one of the aged specimens, with its longitudinal axis vertical, is supported by a clamp at its upper end so that its lower end is 12 inches above a flat horizontal layer of untreated surgical cotton. An unlighted Bunsen burner whose barrel has an inside diameter of 3/8" is supported under the specimen with the longitudinal axis of the barrel vertical and coincident with the longitudinal axis of the specimen, the tip of the barrel being 3/8" below the specimen. With the burner so supported and not in proximity to the specimen, the burner is ignited and adjusted to produce a steady blue flame with an overall height of 3/4". The tests are conducted in a hood which is operated to provide adequate ventilation, but does not effect the flame. The burner flame is moved into position under the specimen, kept there for 10 seconds and then removed. Counting from the instant of removal from the burner flame, the duration of any flaming of the specimen is noted and recorded. Note is also taken and recorded of whether any flaming particles or flaming drops fall from the specimen and ignite the cotton.

The material of which the specimen is representative is acceptable if flaming of the specimen ceases within 10 seconds and if the cotton is not ignited by any particles or drops released during or after the application of the burner flame. If the specimen is acceptable to these conditions, the burner flame is returned immediately to its position under the specimen immediately after flaming of the specimen ceases, kept there for 10 seconds and then removed. The material is acceptable if flaming of the specimen ceases within 10 seconds, glowing ceases within 10 seconds after flaming ceases and if the cotton is not ignited by any particles or drops released during or after application of the burner flame.

If the first specimen passes the two trials set forth above, the trials are repeated on the two remaining aged specimens and the average of the six durations of flaming is determined. The material of which the three specimens are representative is acceptable if the average duration does not exceed 5 seconds. If the three aged specimens are acceptable, the procedure is repeated on the three remaining unaged specimens.

For purposes of classifying the specimens subjected to U.L. Test Subject 94 or 746, an arbitrary numerical rating was assigned to compare the synergism of a combination of a bromine-containing compound and a chlorine-containing compound as flame retardants. This numerical rating is as follows:

0 — Material burns and is not self-extinguishing.
1 — Long time to self-extinguishment, time being lower than 35 seconds. Large amount of dripping or melting and the cotton can be ignited.
3 — Short time to self-extinguishment, less than 10 seconds. Small amount of dripping or melting, cotton can be ignited.
4 — No burning drops of material. The average time for self-extinguishment being less than 30 seconds with a single specimen being less than 35 seconds. There is no ignition of the cotton.
5 — The material drips but the drippings are non-burning. The average time for self-extinguishment is less than 5 seconds with a time for a single specimen being less than 10 seconds. There is no ignition of the cotton.
6 — The material does not drip in the first period of the 10 second ignition.
8 — Material does not drip at all after both periods of ignition.

The specimens which were prepared according to the above paragraphs were labeled "A," "B," "C," and "D," said strips corresponding in nature to strips "A," "B," "C," and "D" which were subjected to the oxygen index test, however no glass cloth was present to prevent dripping. Strip "A" contained the novel composition of matter of the present invention, strip "B" contained only a polypropylene, a bromine-containing compound and antimony trioxide, strip "C" contained polypropylene, the chlorine containing compound and antimony trioxide and strip "D" consisted of only polypropylene. The results of this Underwriters Laboratories Test Subject 94 are set forth in Table II below.

TABLE II

| Strip: | Numerical rating |
|---|---|
| A | 3.6 |
| B | 1.9 |
| C | 0.8 |
| D | 0 |

EXAMPLE II

In this example a novel composition of matter of the present invention was prepared by admixing 100 parts of a commercial high molecular weight polypropylene, 10 parts of antimony trioxide, and 25 parts of a mixture of dibromoneopentyl glycol and 5,6,7,8,9,9-hexachloro-1,2,3,4,4a,5,8,8a-octahydro-5,8-methano - 2,3 - naphthalenedicarboxylic anhydride, the two halogen-containing compounds being present in said mixture in an amount so that the ratio of chlorine to bromine was 6:4. After physically admixing the three components of the novel composition of matter, the resulting admixture was extruded into strips of material similar to that set forth in Example I above. These strips of the novel composition of matter were designated "A." In addition, another set of strips was prepared by admixing 100 parts of polypropylene, 25 parts of dibromoneopentyl glycol and 10 parts of antimony trioxide, said strips being designated as "B." A third set of strips was prepared by admixing 100 parts of polypropylene, 10 parts of antimony trioxide and 25 parts of 5,6,7,8,9,9-hexachloro-1,2,3,4,4a,5,8,8a-octahydro-5,8-methano-2,3-naphthalenedicarboxylic anhydride, said strips being designated as "C." In addition, the 4th set of strips comprise only polypropylene which was designated as "D."

The four sets of strips prepared in the above manner were subjected to Underwriters Laboratories Test Subject 94, said test being described in Example I above. The results of these tests using a numerical rating according to that set forth in Example I had the following results set forth in Table III below.

TABLE III

| Strip: | Numerical rating |
|---|---|
| A | 4.7 |
| B | 1.5 |
| C | 0.8 |
| D | 0 |

EXAMPLE III

A novel composition of matter of the present invention was prepared in this experiment by admixing 100 parts of the commercial high molecular weight polypropylene, 10 parts of antimony trioxide and 25 parts of a mixture of compounds containing dissimilar halogen atoms, said mixture comprising hexabromobiphenyl and 1,4,7,10-dimethanocycloocta - 1,2,3,4,7,8,9,10,13,13,14,14 - dodecachloro - 1,4,4a,5,6,6a,7,10,10a,11,12,12a - dodecahydro-[1,2,5,6]-dibenzene (the two compounds being present in an amount so that the ratio of chlorine to bromine in the mixture was 7.5:2.5). After physically admixing the three components of the novel composition of matter, the admixture was extruded into strips similar to that set forth in Example I above and labeled "A." In addition, a second set of strips was prepared by admixing 100 parts of polypropylene, 10 parts of antimony trioxide and 25 parts of hexabromobiphenyl, the finished strips being labeled "B." A third set of strips was prepared by substituting 25 parts of 1,4,7,10-dimethanocycloocta-1,2,3,4,7,8,9,10,13,13,14,14-dodecachloro - 1,4,4a,5,6,6a,7,10,10a,11,12,12a - dodecahydro-[1,2,5,6]-dibenzene in place of the hexabromobiphenyl the finished strips being labeled "C." As a control, a fourth set of strips containing only the commercial high molecular weight polyproylene were labeled "D."

The four sets of strips prepared according to the above paragraph were subjected to a combustion test to determine the oxygen indices of the various strips. The apparatus and test procedure is that which is described in the November 1966 issue of Modern Plastics. The results of the combustion tests are set forth in Table IV below.

TABLE IV

| Strip: | Oxygen index |
|---|---|
| A | 0.264 |
| B | 0.232 |
| C | 0.250 |
| D | 0.180 |

It is to be noted from the above table that the novel composition of matter of the present invention exhibits a greater oxygen index than that which is possessed by any of the other strips, thus demonstrating the synergistic activity of the halogen-containing mixture consisting of two polyhalo substituted compounds one of which contains polychloro substituents, while the other contains polybromo substituents.

EXAMPLE IV

A novel composition of matter falling within the scope of the present invention was prepared by physically admixing 100 parts of a commercial high molecular weight polypropylene, 10 parts of antimony trioxide and 35 parts of a mixture of two dissimilar polyhalo-substituted compounds. The two dissimilar polyhalosubstituted compounds in this mixture comprised hexabromobiphenyl and bis (1,4,5,6,7,7 - hexachloronorborn-5-ene-2yl)benzene, the compounds being present in a mixture so that the ratio of chlorine to bromine was 6:4. After physically admixing the various components of the composition of matter, the mixture was extruded into strips which were labeled "A." As in the previous examples, a second set of strips was prepared by admixing 100 parts of polypropylene, 10 parts of antimony trioxide and 35 parts of hexabromobiphenyl, said strips being labeled "B." A third set of strips was prepared by admixing 100 parts of polypropylene, 10 parts of antimony trioxide and 35 parts of bis(1,4,5,6,7,7-hexachloro-norborn-5-ene-2yl)benzene, said strips being labeled "C." Also as in previous examples, a control strip consisting only of the high molecular weight polypropylene was prepared and labeled "D." The four sets of strips were subjected to a combustion test similar to that hereinbefore described with the following results.

TABLE V

| Strip: | Oxygen index |
|---|---|
| A | 0.315 |
| B | 0.235 |
| C | 0.293 |
| D | 0.180 |

EXAMPLE V

In this example, a novel composition of matter was prepared by physically admixing 100 parts of high impact polystyrene, 10 parts of antimony trioxide and 25 parts of a mixture comprising hexabromobiphenyl and bis(1,4,5,6,7,7-hexachloronorborn-5-ene-2yl)benzene, the two halogen-containing compounds being present in said mixture in an amount so that the ratio of bromine to chlorine was 7.5:2.5. After physically admixing the components of the composition of matter, the resulting admixture was extruded into strips similar to those prepared according to the above examples and labeled "A." In like manner a second set of strips labeled "B" was prepared by admixing 100 parts of polystyrene, 10 parts of antimony trioxide and 25 parts of hexabromobiphenyl. A third set of strips marked "C" were prepared by substituting 25 parts of bis(1,4,5,6,7,7 - hexachloronorborn-5-ene-2yl)benzene for the 25 parts of hexabromobiphenyl found in strip "B." The control strip marked "D" consisted only of the high impact polystyrene. These strips were again subjected to a combustion test similar in nature to that set forth in Example I to determine the oxygen index of the various strips. The results of this test are set forth in Table VI below.

TABLE VI

| Strips: | Oxygen index |
|---|---|
| A | 0.337 |
| B | 0.306 |
| C | 0.293 |
| D | 0.182 |

It is noted from the above examples that all of the novel compositions of matter of the present invention possessed an oxygen indices and flame retardancy far superior in nature to those products produced by strips of polymers and flame retardants which did not contain all of the components of said novel composition of matter.

EXAMPLE VI

In like manner a novel composition of matter was prepared by physically admixing 100 parts of a commercial high molecular weight polypropylene, 10 parts of antimony trioxide, 1 part of dibutyl tin maleate, and 25 parts of a mixture of two dissimilar polyhalo-substituted compounds. The two dissimilar polyhalo-substituted compounds in this mixture comprise hexabromocyclododecane and 5,6,7,8,9,9 - hexachloro-1,2,3,4,4a,5,8,8a-octahydro-5,8-methano-2,3-naphthalenedicarboxylic anhydride. After physically admixing the various components of the composition of matter, the mixture was extruded into strips similar in configuration to those set forth in Example I above. In addition, a second set of strips are prepared by admixing 100 parts of the polypropylene, 10 parts of antimony trioxide, 1 part of dibutyl tin maleate and 50 parts of 5,6,7,8,9,9-hexachloro-1,2,3,4,4a,5,8,8a-octahydro-5,8-methano-2,3-naphthalenedicarboxylic anhydride. A third set of strips was also prepared, the difference in said strips being that 33.4 parts of hexabromocyclododecane was substituted for the 50 parts of 5,6,7,8,9,9-hexachloro - 1,2,3,4,4a,5,8,8a-octahydro-5,8-methano-2,3-naphthalenedicarboxylic anhydride in the second set of strips.

The three sets of strips were tested according to the method set forth in Underwriters Laboratories Test Subject 94, the mechanics of said test being set forth in Example I above. The strips which comprised the novel composition of matter of the present invention were found to be non-dripping during the first 10 seconds of ignition. This would conform to a numerical rating of six based upon the table set forth in Example I above. In contrast, both the second and third set of strips which contain only one halogen-containing flame retardant dripped heavily during the test. This clearly demonstrates the synergistic activity as pertains to flame retardancy when there are two flame retardants present, said flame retardants containing dissimilar halogen substituents.

I claim as my invention:

1. A flame retardant composition of matter which comprises polypropylene, 1,4,7,10-dimethanocycloocta-1,2,3,4,7,8,9,10,13,13,14,14-dodecachloro - 1,4,4a,5,6,6a,7,10,10a,11,12,12a-dodecahydro-[1,2,5,6]-dibenzene, hexabromobiphenyl and antimony trioxide.

2. The flame retardant composition of matter as set forth in claim 1 in which said 1,4,7,10-dimethanocycloocta-1,2,3,4,7,8,9,10,13,13,14,14 - dodecachloro-1,4,4a,5,6,6a,7,10,10a,11,12,12a-dodecahydro - [1,2,5,6] - dibenzene and said hexabromobiphenyl are present in an amount in the range of from about 5% to about 50% by weight of the polypropylene.

3. The flame retardant composition of matter as set forth in claim 1 in which said antimony trioxide is present in an amount in the range of from about 0.2 to about 15% by weight of the polypropylene.

References Cited
UNITED STATES PATENTS

| | | | |
|---|---|---|---|
| 3,403,118 | 9/1968 | Listner | 260—33.8 UA |
| 3,418,267 | 12/1968 | Busse | 260—33.8 R |
| 3,487,040 | 12/1969 | Jolles | 260—37 R |
| 3,403,036 | 9/1968 | Hindersinn | 260—33.8 UA |
| 3,347,822 | 10/1967 | Jenkner | 260—33.8 UA |

ALLAN LIEBERMAN, Primary Examiner

P. R. MICHL, Assistant Examiner

U.S. Cl. X.R.

260—28.5 R, 45.7 R, 45.75 B, 45.75 K, 45.8 A, 45.95 R, DIGEST 24